(12) United States Patent
Jung

(10) Patent No.: US 10,163,009 B2
(45) Date of Patent: Dec. 25, 2018

(54) APPARATUS AND METHOD FOR RECOGNIZING IRIS

(71) Applicant: Samsung Electronics Co., Ltd., Suwon-si, Gyeonggi-do (KR)

(72) Inventor: Han-sub Jung, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 282 days.

(21) Appl. No.: 14/804,614

(22) Filed: Jul. 21, 2015

(65) Prior Publication Data
US 2016/0034759 A1 Feb. 4, 2016

(30) Foreign Application Priority Data
Aug. 4, 2014 (KR) ........................ 10-2014-0100011

(51) Int. Cl.
*G06K 9/00* (2006.01)
*H04N 5/44* (2011.01)
*G06K 9/20* (2006.01)

(52) U.S. Cl.
CPC ..... *G06K 9/00604* (2013.01); *G06K 9/00597* (2013.01); *G06K 9/00617* (2013.01); *G06K 9/00912* (2013.01); *G06K 9/2018* (2013.01); *G06K 9/2027* (2013.01); *H04N 5/44* (2013.01)

(58) Field of Classification Search
CPC ............. G06K 9/00604; G06K 9/2027; G06K 9/00912; G06K 9/2018; G06K 9/00617; H04N 5/44
See application file for complete search history.

(56) References Cited

U.S. PATENT DOCUMENTS

| | | | | |
|---|---|---|---|---|
| 2008/0075441 | A1* | 3/2008 | Jelinek | G06K 9/00604 396/18 |
| 2012/0212597 | A1* | 8/2012 | Hanna | G06K 9/00604 348/78 |
| 2013/0162799 | A1 | 6/2013 | Hanna et al. | |
| 2014/0055342 | A1* | 2/2014 | Kamimura | G06F 3/013 345/156 |
| 2015/0294464 | A1* | 10/2015 | Kim | G06K 9/00597 382/117 |
| 2016/0224777 | A1* | 8/2016 | Rebelo | G06F 21/32 |

FOREIGN PATENT DOCUMENTS

EP 1 241 614 A2 9/2002

OTHER PUBLICATIONS

Kourkoumelis, N. and Tzaphlidou, M., Eye safety related to near infrared radiation exposure to biometric devices. The Scientific World Journal 11, pp. 520-528. XP 055244801, Mar. 1, 2011.
Richard Wildes, Iris Recognition, pp. 63-95, XP 055245494.

* cited by examiner

*Primary Examiner* — Tat C Chio
(74) *Attorney, Agent, or Firm* — Jefferson IP Law, LLP

(57) ABSTRACT

An iris recognition apparatus is provided. The iris recognition apparatus includes a first photographer configured to photograph an iris in a visible ray wavelength range, a second photographer configured to photograph in an infrared ray wavelength range, a determiner configured to determine whether the iris photographed by the first photographer satisfies a predetermined condition, and a controller configured to, in response to the photographed iris satisfying the predetermined condition, control the second photographer to photograph the iris, and to perform iris recognition using the iris photographed in the infrared ray wavelength range.

17 Claims, 7 Drawing Sheets

APPARATUS AND METHOD FOR RECOGNIZING IRIS

CROSS-REFERENCE TO RELATED APPLICATION(S)

This application claims the benefit under 35 U.S.C. § 119(a) of a Korean patent application filed on Aug. 4, 2014 in the Korean Intellectual Property Office and assigned Serial number 10-2014-0100011, the entire disclosure of which is hereby incorporated by reference.

TECHNICAL FIELD

The present disclosure relates to an apparatus and method for recognizing an iris. More particularly, the present disclosure relates to an apparatus and method for recognizing an iris, which can minimize the exposure of user's eyes to infrared rays when recognizing the iris.

BACKGROUND

At present, a heightened interest in security and various electronic devices related to security are increasingly being made available. For example, security-related electronic devices such as a gate locking device, a safe, and the like are used.

In the security-related technology, biometric techniques using fingerprints and irises are in the spotlight for their potential to facilitate high security, and portable devices employing the biometric techniques as solutions to security problems related to personal information have become desired.

Iris recognition, which is one of the biometric techniques, uses iris patterns of eyeballs having a unique characteristic for each person, and is considered as a preferred security technique in view of accuracy and stability of data, facility of use, and a processing speed, in comparison with fingerprint or retina recognition. The iris has its unique pattern when a person is one or two years old and does not change its pattern for the entirety of a person's life, and also, the iris recognition has 266 determination criteria, which is nine times more than those of fingerprint recognition, 30 determination criteria, and may be thought to be one of the better methods for identifying a person. In addition, since the iris recognition is a non-contact method which recognizes an iris pattern using a camera at a distance of about 8-25 cm from a person, users have minimal aversion to using it and it is possible to recognize biometric information quickly (e.g., within 2 seconds).

The iris recognition uses an infrared ray photographing device. An iris image is obtained by scanning the iris with infrared rays and photographing the infrared rays reflected back from the iris. The infrared rays are less reflected on the cornea unlike the visible rays and thus are effective in photographing the iris pattern.

However, when the eyes are frequently exposed to infrared rays, the eyes may get dry, and even worse, there is a report that infrared rays may cause a cataract. In particular, when an iris recognition device is implemented as a portable device and performs iris recognition outside, the intensity of infrared rays may increase due to the influence of external light and thus may cause even more damage to the eyes.

In view of the above, there is a need for a method for minimizing the exposure to infrared rays to eyes when the iris is recognized.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an apparatus and method for recognizing an iris, which can minimize the eye's exposure to infrared rays when recognizing the iris.

In accordance with an aspect of the present disclosure, an iris recognition apparatus is provided. The iris recognition apparatus includes a first photographer configured to photograph an iris in a visible ray wavelength range, a second photographer configured to photograph in an infrared ray wavelength range, a determiner configured to determine whether the iris photographed by the first photographer satisfies a predetermined condition, and a controller configured to, in response to the photographed iris satisfying the predetermined condition, control the second photographer to photograph the iris, and to perform iris recognition using the iris photographed in the infrared ray wavelength range.

In accordance with an aspect of the present disclosure, the second photographer is configured to project the infrared rays onto the iris and photograph the iris projected with the infrared rays.

In accordance with an aspect of the present disclosure, the second photographer may include an infrared ray projector configured to project infrared rays onto the iris and an image processor including a lens through which infrared rays reflected from the iris enter, and the infrared ray projector and the image processor may be different hardware.

In accordance with an aspect of the present disclosure, in response to the infrared rays being projected by the second photographer for a predetermined time, the controller may be configured to stop projecting the infrared rays.

In accordance with an aspect of the present disclosure, in response to a size of the iris photographed by the first photographer being greater than or equal to a predetermined size, the determiner may be configured to determine that the predetermined condition is satisfied.

In accordance with an aspect of the present disclosure, in response to a location of the iris in an image photographed by the first photographer being a predetermined area, the determiner may be configured to determine that the predetermined condition is satisfied.

In accordance with an aspect of the present disclosure, the first photographer may be configured to photograph a moving image, and, in a first frame and a second frame which are continuous in the photographed moving image, in response to the size of the iris in the first frame being detected as a first size, and the size of the iris in the second frame being detected as a second size which is greater than the first size, the determiner may be configured to determine that the predetermined condition is satisfied.

In accordance with an aspect of the present disclosure, the iris recognition apparatus may further include a display configured to display a guide object informing an area where an eye should be placed, along with the image photographed by the first photographer, in order to improve accuracy of iris recognition.

In accordance with an aspect of the present disclosure, the first photographer, the second photographer, and the display may be arranged on a same plane of the iris recognition apparatus.

In accordance with an aspect of the present disclosure, the iris recognition apparatus may be one of a smartphone, a digital camera, smart glasses, a smart watch, or a Portable Multimedia Player (PMP).

In accordance with another aspect of the present disclosure, an iris recognition apparatus is provided. The iris recognition apparatus includes a photographer configured to photograph an iris in at least one of a visible ray wavelength range or an infrared ray wavelength range, a determiner configured to determine whether the iris photographed in the visible ray wavelength range by the photographer satisfies a predetermined condition, and a controller configured to, in response to the iris photographed in the visible ray wavelength range satisfying the predetermined condition, control the photographer to photograph the iris in the infrared ray wavelength range, and to perform iris recognition using the iris photographed in the infrared ray wavelength range.

In accordance with an aspect of the present disclosure, the photographer may be configured to project one of a visible ray or an infrared ray onto the iris and photograph the iris projected with the one of the visible ray or the infrared ray.

In accordance with another aspect of the present disclosure, an iris recognition method is provided. The iris recognition method includes photographing an iris in a visible ray wavelength range, determining whether the photographed iris satisfies a predetermined condition using the photographed iris, and, in response to the photographed iris satisfying the predetermined condition, photographing the iris in an infrared ray wavelength range and performing iris recognition.

In accordance with an aspect of the present disclosure, the performing of the iris recognition may include, in response to the photographed iris satisfying the predetermined condition, projecting infrared rays onto the iris and photographing the iris projected with the infrared rays.

In accordance with an aspect of the present disclosure, the performing of the iris recognition may include, in response to the infrared rays being projected for a predetermined time, stopping the projecting of the infrared rays.

In accordance with an aspect of the present disclosure, the determining may include, in response to a size of the photographed iris being greater than or equal to a predetermined size, determining that the predetermined condition is satisfied.

In accordance with an aspect of the present disclosure, the determining may include, in response to a location of the iris in the image photographed in the visible ray wavelength range being a predetermined area, determining that the predetermined condition is satisfied.

In accordance with an aspect of the present disclosure, the photographing of the iris in the visible ray wavelength rage may include photographing the iris as a moving image, and the determining may include, in a first frame and a second frame which are continuous in the photographed moving image, in response to the size of the iris in the first frame being detected as a first size, and the size of the iris in the second frame being detected as a second size which is greater than the first size, determining that the predetermined condition is satisfied.

In accordance with an aspect of the present disclosure, the photographing of the iris in the visible ray wavelength rage may include displaying a guide object informing an area where an eye should be placed, along with the image photographed in the visible ray wavelength range, in order to improve accuracy of iris recognition.

According to various embodiments of the present disclosure as described above, the time that the user spends having the user's eye exposed to infrared rays when the iris is recognized can be reduced, and the accuracy of iris recognition can be improved.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
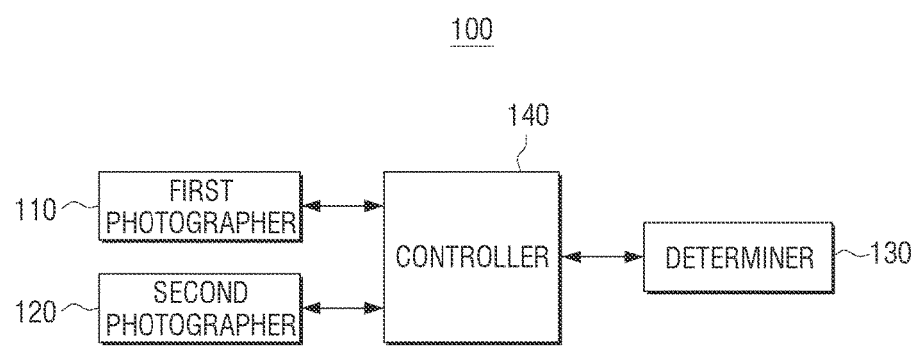
FIG. 1 is a block diagram to illustrate an iris recognition apparatus according to an embodiment of the present disclosure.

FIG. 1 is a block diagram to explain an iris recognition apparatus 100 according to an embodiment of the present disclosure.

The iris recognition apparatus 100 may be a device which specializes only in an iris recognition function or various electronic devices equipped with an iris recognition function. For example, the iris recognition apparatus 100 may be implemented by using various portable devices such as a digital camera, a cellular phone, a smartphone, smart glasses, a tablet Personal Computer (PC), a smart watch, a Portable Multimedia Player (PMP), and the like. The smart glasses are a wearable device and are mounted on a user's head and perform various functions by detecting a change in the user's eye movement or recognizing a voice. The smart watch is also a wearable device and may be understood as a miniature form of a smartphone.

Referring to FIG. 1, the iris recognition apparatus 100 includes a first photographer 110, a second photographer 120, a determiner 130, and a controller 140.

The first photographer 110 and the second photographer 120 are configured to photograph subjects and generate images. In particular, the first photographer 110 may photograph a visible ray wavelength range (about 380-800 nm) reflected from a subject, and the second photographer 120 may photograph an infrared ray wavelength range (about 780 nm-1 mm (a few hundred μm) reflected from a subject.

Specifically, the first photographer 110 or the second photographer 120 may include a shutter, an aperture, a solid state pickup device, an Analog Front End (AFE), and a Timing Generator (TG).

The shutter adjusts a time at which light reflected from a subject enters the first photographer 110 or the second photographer 120, and the aperture adjusts an amount of light entering a lens by mechanically increasing or reducing the size of an opening through which light enters. In response to the light reflected from the subject being accumulated as photo-charge, the solid state pickup device outputs an image caused by the photo-charge as an electric signal. For example, the solid state pickup device may include a Charge-Coupled Device (CCD). The TG outputs a timing signal for reading out pixel data of the solid state pickup device, and the AFE samples and digitizes the electric signal output from the solid state pickup device.

The first photographer 110 and the second photographer 120 may be configured as separate elements in the iris recognition apparatus 100. Therefore, the iris recognition apparatus 100 may be implemented by mounting the second photographer 120, which photographs in the infrared ray wavelength range, in an existing portable device equipped with the first photographer 110 for photographing in the visible ray wavelength range, such as a mobile phone.

According to an embodiment of the present disclosure, the first photographer 110 and the second photographer 120 may be implemented as a single element sharing the same lens. In this case, a first filter which blocks infrared rays and ultraviolet rays and allows only the visible rays to pass, and a second filter which blocks visible rays and ultraviolet rays and allows only the infrared rays to pass may be alternately arranged behind the lens according to a photographing mode.

For example, in a general photographing mode, the controller 140 may control the first filter to be located behind the lens, and, in an infrared ray photographing mode, the controller 140 may control the second filter to be located behind the lens.

The second photographer 120 may include an infrared ray projector to project infrared rays onto a user's iris. The infrared rays are necessary for iris recognition, but may be harmful to user's eyes. According to various embodiments of the present disclosure, the iris recognition apparatus 100 photographs a user's eye in the visible ray wavelength range first and then projects the infrared rays only when it is determined that the user's eye is in a condition appropriate for iris recognition. Therefore, the time the user spends having a user's eyes exposed to the infrared rays can be reduced.

Hereinafter, the determiner 130 for determining whether the user's eye is in a condition appropriate for iris recognition will be explained.

The determiner 130 is configured to determine whether the iris photographed in the visible ray wavelength range satisfies a predetermined condition or not. The predetermined condition is a condition for allowing the iris recognition apparatus 100 to proceed to an infrared ray photographing operation for iris recognition, and may be a condition on the size of an iris and the location of an iris in a photographed image.

Specifically, the determiner 130 may determine that the predetermined condition is satisfied when the size of the iris photographed by the first photographer 110 is greater than or equal to a predetermined size.

The size of the iris may be determined in various related-art methods. For example, the size of the iris may be determined in plural phases. Specifically, the size of the iris in the photographed image may be determined by the operations of detecting the location of the eye in the image photographed by the first photographer 110, and extracting boundaries of the pupil and the iris from the detected location of the eye. In addition, the size of the iris may be determined based on various factors such as a degree of eye closure or the location of the pupil in the eye.

The size of the iris may be determined on a real time basis while the first photographer 110 photographs the user's iris as a moving image. The determiner 130 may analyzes each frame of the photographed moving image and determine that the user's eye is in the condition appropriate for iris recognition in response to the size of the iris being greater than or equal to the predetermined size.

According to an embodiment of the present disclosure, the determiner 130 may determine that the predetermined condition is satisfied even in response to the size of the iris photographed by the first photographer 110 being less than the predetermined size.

Specifically, a predetermined time is required until infrared ray photographing is performed by the second photographer 120, and the size of the iris may gradually increase during that time. Therefore, the determiner 130 may determine that the predetermined condition is satisfied when the size of the iris is expected to increase. That is, in response to the size of the iris in the first frame out of the continuous frames of the moving image, which is photographed by the first photographer 110, being detected as a first size, and the size of the iris in the second frame being detected as a second size, which is greater than the first size, the determiner 130 may determine that the predetermined condition is satisfied. This will be explained below in more detail with reference to FIGS. 2A and 2B.

Figure 2A:
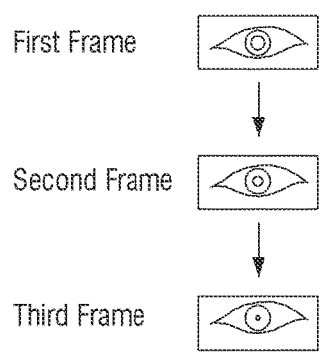
FIGS. 2A and 2B are views to illustrate an iris recognition method according to various embodiments of the present disclosure.
Figure 2B:
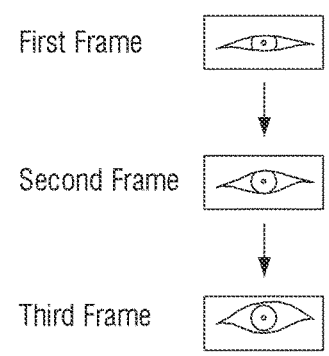

FIGS. 2A and 2B are views to illustrate an iris recognition process according to various embodiments of the present disclosure.

Referring to FIG. 2A, in response to the size of the iris in the second frame being greater than that in the first frame photographed by the first photographer 110, and the size of the iris in the third frame being greater than that in the second frame, the determiner 130 may determine that the predetermined condition is satisfied. This case may be a case in which the amount of light projected onto the user's eye gradually increase or a case in which the user's eye adjusts to the darkness and thus the pupil gradually decreases.

In addition, referring to FIG. 2B, when the user shifts from the state in which the user does not completely open the eyes to the state in which the user opens the eyes while passing through the first frame, the second frame, and the third frame, the size of the iris in the second frame is greater than that in the first frame and the size of the iris in the third frame is greater than that in the second frame. In this case, the determiner 130 may determine that the predetermined condition is satisfied.

In FIGS. 2A and 2B, the three frames are provided. However, this should not be considered as limiting. The number of frames used in the determiner 130 may be any number greater than or equal to 2.

In addition to the examples of FIGS. 2A and 2B, the embodiments of the present disclosure may be applied when the user's pupil, which is located on the edge of the eye, gradually shifts to the center of the eye. That is, the embodiments of the present disclosure may be applied to any case in which the size of the iris gradually increases.

In addition, in response to the location of the iris in the image photographed by the first photographer 110 belonging to a predetermined area, the determiner 130 may determine that the predetermined condition is satisfied.

When the infrared rays are projected for iris recognition, the infrared rays may be concentrated on a specific portion rather than being equally projected onto the entire area of a subject. That is, when the user's eye is placed on the area where the infrared rays are concentrated, the accuracy of iris recognition can be improved.

According to an embodiment of the present disclosure, a predetermined area which receives the largest infrared rays may be set on the image photographed by the first photographer 110. The determiner 130 may determine that the condition for iris recognition is satisfied in response to the eye entering the predetermined area of the image photographed by the first photographer 110.

The controller 140 may display a guide object along with the image photographed by the first photographer 110 to assist the user in locating the user's eye on the location providing the high accuracy of iris recognition. This will be explained below in more detail with reference to FIG. 5.

According to an embodiment of the present disclosure, the determiner 130 may consider both the size condition of the iris and the location condition of the iris, and determine that the predetermined condition is satisfied only in response to both conditions being satisfied. For example, only in response to the size of the iris in the image photographed by the first photographer 110 being greater than or equal to the predetermined size (or having the tendency to increase), and the location of the iris in the image being the predetermined area, the determiner 130 may determine that the user's eye is in the condition appropriate for iris recognition.

The controller 140 may be configured to control the overall configuration of the iris recognition apparatus 100, and may control operations of hardware provided in the iris recognition apparatus 100 and support various functions by executing an Operating System (OS) or various applications stored in a memory provided in the iris recognition apparatus 100.

In response to an iris recognition command being input by the user, the controller 140 may control the first photographer 110 to photograph the iris in the visible ray wavelength range.

In this case, the iris recognition command may be input by pressing a specific button provided on a button disposed on the iris recognition apparatus 100 or by touching a specific button displayed on a touch screen when the iris recognition apparatus 100 is provided with the touch screen. In addition, when the iris recognition apparatus 100 supports a voice recognition function, the controller 140 may control the first photographer 110 to photograph the iris in the visible ray wavelength range in response to a voice command for iris recognition being input. That is, the iris recognition apparatus 100 may receive an input of the iris recognition command through various kinds of input devices.

In particular, in response to determining that the iris photographed by the first photographer 110 satisfies the predetermined condition by the determiner 130, the controller 140 may control the second photographer 120 to photograph the user's iris in the infrared ray wavelength range.

In this case, the controller 140 may control the infrared ray projector included in the second photographer 120 to project the infrared rays onto the user's iris, and control the second photographer 120 to photograph the infrared rays reflected from the iris.

In addition, as described above, in the iris recognition apparatus 100, the first photographer 110 and the second photographer 120 may share a single lens, and the first filter which blocks infrared rays and ultraviolet rays and allows only the visible rays to pass, and the second filter which blocks visible rays and ultraviolet rays and allows only the infrared rays to pass may be alternately arranged behind the lens.

In this case, in response to the iris recognition command being input by the user, the controller 140 may control the first filter to be located behind the lens and photograph the iris in the visible ray wavelength range. In addition, in response to determining that the photographed iris satisfies the predetermined condition by the determiner 130, the controller 140 may control the second filter to be located behind the lens and photograph the iris in the infrared ray wavelength range.

In the above-described embodiments of the present disclosure, the infrared ray projector for projecting the infrared rays is included in the iris recognition apparatus 100 as an individual element. However, the iris recognition apparatus 100 may include a single light emitter which emits at least one of the visible ray or the infrared ray.

Hereinafter, various types of iris recognition apparatuses 100 will be explained with reference to FIGS. 3 and 4.

Figure 3:
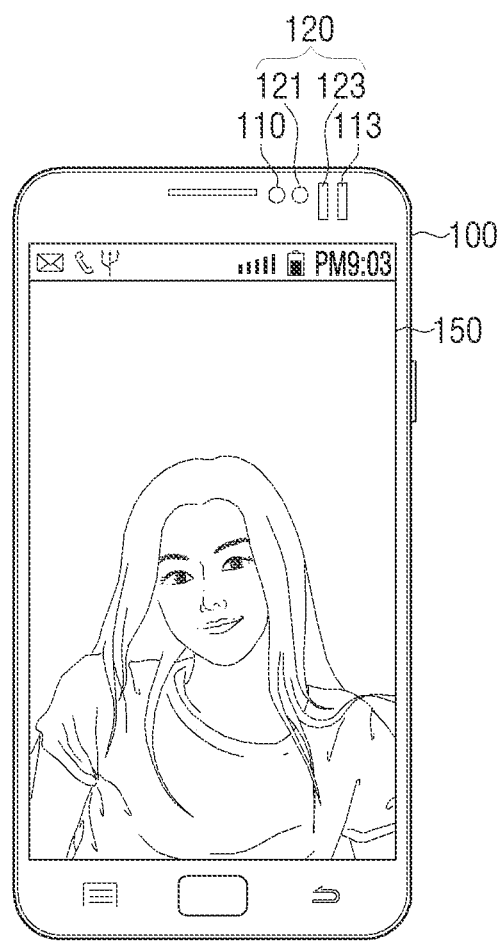
FIGS. 3 and 4 are views illustrating an iris recognition apparatus according to various embodiments of the present disclosure.

FIG. 3 is a view showing an iris recognition apparatus 100 according to an embodiment of the present disclosure.

Referring to FIG. 3, the iris recognition apparatus 100 may be implemented by using a portable device such as a smartphone.

The smartphone generally includes a rear camera and a front camera. In this case, the front camera may be used as the first photographer 110. In addition, the smartphone may include a flash 113 which emits light of visible rays.

The second photographer 120 for performing infrared ray photographing is added such that the smartphone is operated as the iris recognition apparatus 100. The second photographer 120 may include an infrared ray projector 123 to project infrared rays onto the user's iris and a lens 121 to receive infrared rays reflected from the iris.

Specifically, the second photographer 120 may include the infrared ray projector 123 and an image processor which is provided with the lens 121 through which the infrared rays reflected from the iris enter, and the infrared ray projector 123 and the image processor provided with the lens 121 may be different hardware. That is, the respective elements may be configured as different hardware and the iris recognition apparatus 100 may be implemented by combining the plurality of pieces of hardware. Likewise, in the first photographer 110, an image processor provided with a lens and the flash 113 may be implemented by different hardware.

A display 150 may be placed on the same plane as that of the first photographer 110 and the second photographer 120, and may display the photographed image on a real time basis. Another embodiment of the present disclosure using the display 150 will be explained below with reference to FIG. 6.

Figure 4:
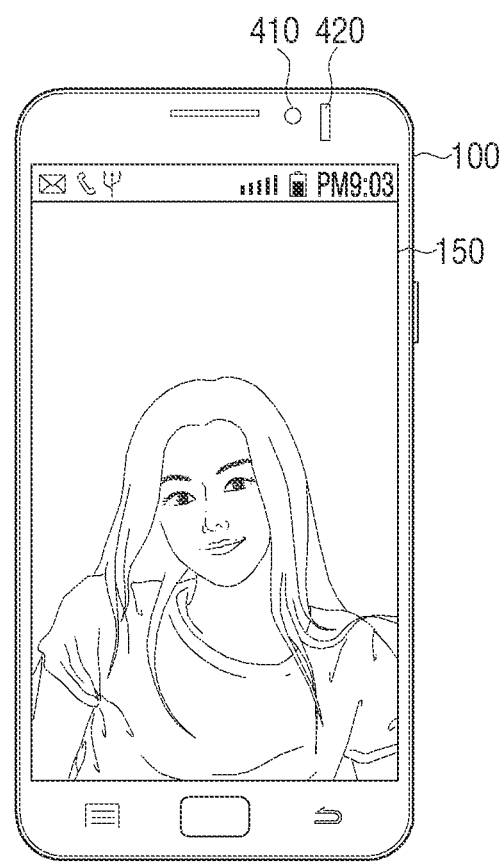

FIG. 4 is a view showing an iris recognition apparatus 100 according to an embodiment of the present disclosure.

Referring to FIG. 4, the first photographer 110 and the second photographer 120 may share a single lens 410. In this case, a first filter which blocks infrared rays and ultraviolet rays and allows only the visible rays to pass, and a second filter which blocks visible rays and ultraviolet rays and allows only the infrared rays to pass may be alternately arranged behind the lens according to a photographing mode. That is, in a general photographing mode, the iris recognition apparatus 100 may place the first filter behind the lens 410 to operate as the first photographer 110, and, in an infrared ray photographing mode, the iris recognition apparatus 100 may place the second filter behind the lens 410 to operate as the second photographer 120.

As described above, when the first photographer 110 and the second photographer 120 share the lens, there is no distance error between the iris image photographed in the visible ray wavelength range and the iris image photographed in the infrared ray wavelength range and thus the iris can be more exactly recognized.

In addition, the iris recognition apparatus 100 may include a light emitter 420 to emit visible rays in the general photographing mode and emit infrared rays in the infrared ray photographing mode. In this case, in the general photographing mode, the controller 140 may control the light emitter 420 to emit visible rays to lighten a subject. In an iris recognition mode, in response to determining that the iris photographed in the visible ray wavelength range satisfies the predetermined condition by the determiner 130, the controller 140 may control the light emitter 420 to emit infrared rays.

In FIGS. 3 and 4, the iris recognition apparatus 100 is a portable device. However, the iris recognition apparatus 100 may be implemented in the form of a security device which is attached to a door.

The infrared rays projected from the iris recognition apparatus 100 may be projected onto the entire subject with regular intensity of light, but may be projected onto a specific portion of the subject with intensity of light suitable for iris recognition. Therefore, the user should place the eyes on the specific portion.

However, it is difficult for the user to know whether the current eye's location is appropriate to iris recognition. In view of this, the iris recognition apparatus 100 according to an embodiment of the present disclosure may further include the display 150 to display a guide object informing an area where the user's eye should be placed for the purpose of enhancing the accuracy of iris recognition. This will be explained below in more detail with reference to FIG. 5.

Figure 5:
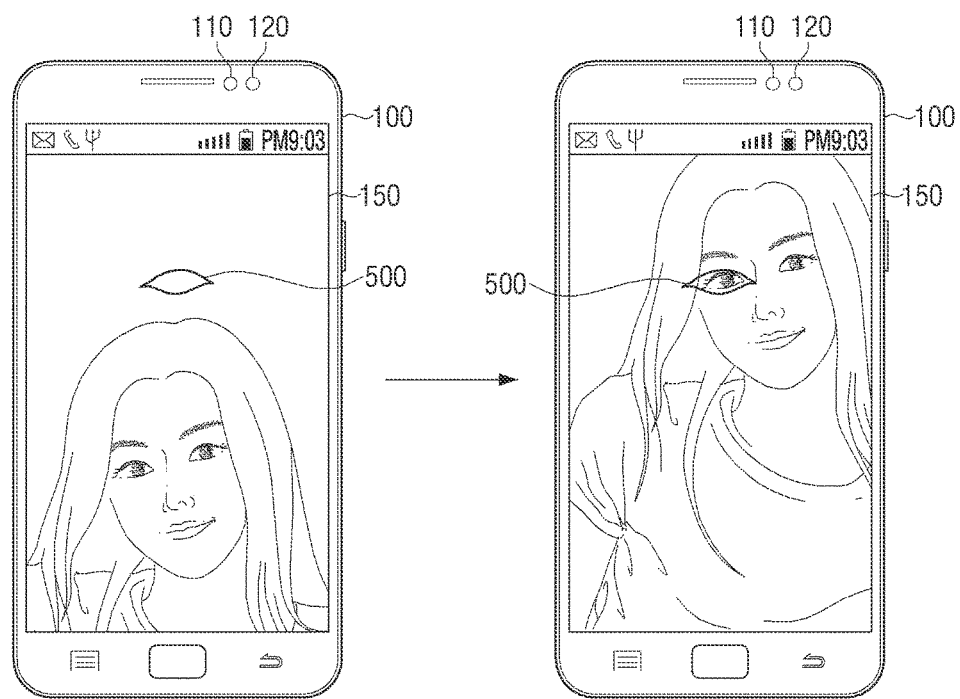
FIG. 5 is a view to illustrate a display of a guide object in an iris recognition apparatus according to an embodiment of the present disclosure.

FIG. 5 is a view to illustrate the display 150 of the iris recognition apparatus 100 according to an embodiment of the present disclosure.

Referring to FIG. 5, the display 150 may display an image photographed by the first photographer 110, and display a guide object 500 informing the area where the user's eye should be placed, by overlaying the image with it.

In this case, since the display 150 is arranged on the same plane as that of the first photographer 110 and the second photographer 120, the user can check whether the user's eye location in the image photographed by the first photographer 110 is appropriate to the iris recognition or not on a real time basis through the display 150.

In a related-art device, such a guide object may be displayed along with an infrared ray photographed image. However, a user's iris photographed with infrared rays is prohibited from being displayed due to security problems. This is because a user's iris photographed with infrared rays contains iris pattern information as it is. Therefore, the related-art method could not help displaying a separate graphic image substituting for a user's real eye. However, according to an embodiment of the present disclosure, the iris photographed with visible rays can be used as it is along with the guide object.

The location of the guide object 500 should be changed according to the location of the infrared ray projector 124 in the iris recognition apparatus 100. That is, since the guide object 500 guides the location for receiving the largest infrared rays, the location of the guide object 500 is affected by the location of the infrared ray projector 124, rather than the location of the lens or the location of a visible ray flash.

According to the above-described embodiment of the present disclosure, as shown in FIG. 5, the user can easily place the user's eye so as to correspond to the guide object 500 displayed along with the image photographed by the first photographer 110.

In response to the user's eye being placed on the guide object 500 and determining that the iris in the image photographed by the first photographer 110 satisfies the predetermined condition, the controller 140 may control the second photographer 120 to photograph the iris in the infrared ray wavelength range. That is, the iris recognition apparatus 100 considers the location of the iris in the photographed image as well as the size of the iris, and thus can improve the accuracy of iris recognition.

The iris recognition apparatus 100 may include a storage (not shown) to store a user's iris recognition pattern, and the controller 140 may perform iris recognition by determining whether the pattern of the iris photographed by the second photographer 120 matches a pre-stored iris pattern.

The pattern of the iris may be formed by separating only the iris part from the iris image photographed with infrared rays and binarizing the separated iris part. The iris pattern is different from person to person like a fingerprint pattern. The iris pattern matching process may be performed in various related-art methods and thus a detailed description is omitted.

In response to no matching iris pattern being searched for a predetermined time after the iris is photographed with infrared rays by the second photographer 120, the controller 140 may stop photographing with infrared rays. In this case, the controller 140 may control the first photographer 110 to re-photograph the user's iris in the visible ray wavelength range. Thereafter, the above-described process is repeated.

In particular, when the iris recognition apparatus 100 is implemented by using a portable device, the user's eye location is easy to change after the determiner 130 determines that the user' eye is appropriate to iris recognition. Accordingly, according to an embodiment of the present disclosure, the controller 140 may refrain from continuing to project the infrared rays onto the user's eye and stop projecting the infrared rays when iris recognition is not performed for a predetermined time, and control the first photographer 110 to operate and then the determiner 130 may determine again whether the user's eye is appropriate to iris recognition.

An iris recognition method according to various embodiments of the present disclosure will be explained with reference to FIGS. 6 and 7.

Figure 6:
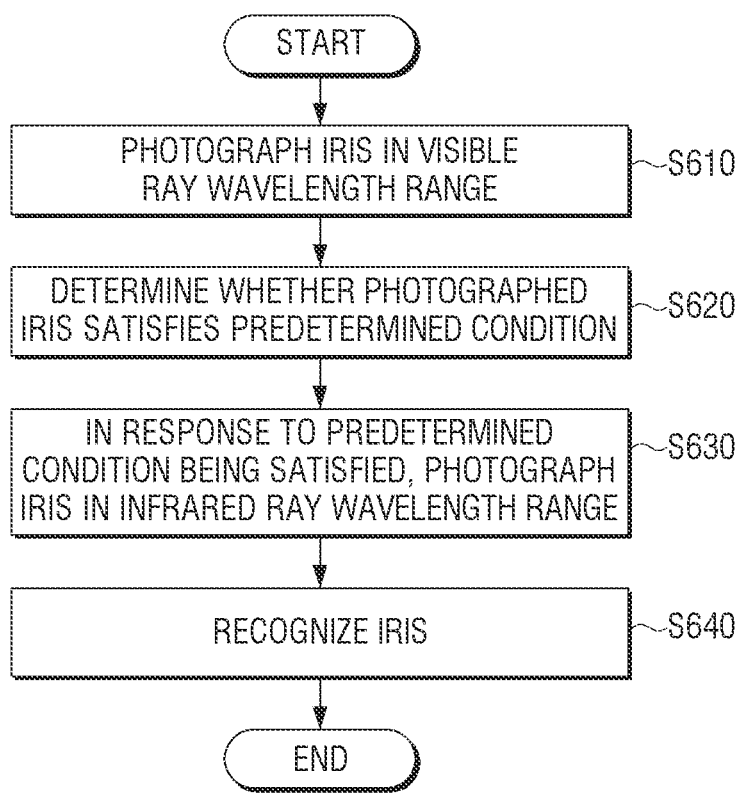
FIGS. 6 and 7 are flowcharts to illustrate an iris recognition method according to various embodiments of the present disclosure.

FIG. 6 is a flowchart to illustrate an iris recognition method according to an embodiment of the present disclosure.

First, in response to an iris recognition command being input by the user, the iris recognition apparatus 100 photographs the user's iris in the visible ray wavelength range at operation S610. In this case, visible rays may be projected onto the iris from a visible ray emitter included in the iris recognition apparatus 100, so that a sufficient amount of visible ray is projected. The iris recognition apparatus 100 may include an illumination sensor. In response to determining that the amount of light sensed by the illumination sensor is not sufficient to photograph with visible rays, the controller 140 may control the light emitter to automatically emit the visible rays.

The iris recognition apparatus 100 determines whether the photographed iris satisfies a predetermined condition or not using the iris photographed in the visible ray wavelength range at operation S620. The predetermined condition may refer to a case in which the size of the iris is greater than or equal to a predetermined size or a case in which the size of the iris in a plurality of continuous frames gradually increases as a result of analyzing the photographed image on a frame basis.

In addition to the size of the iris, in response to the location of the iris in the image existing in a predetermined area, the iris recognition apparatus 100 may determine that the predetermined condition is satisfied.

In response to the iris photographed in the visible ray wavelength range satisfying the predetermined condition, the iris recognition apparatus 100 photographs the user's iris in the infrared ray wavelength range at operation S630, and performs iris recognition at operation S640.

In this case, the controller 140 may control the infrared ray projector to project the infrared rays onto the user's iris. In addition, the controller 140 may form an iris pattern by separating an iris part from the image photographed with infrared rays and binarizing the separated iris part. In response to the formed iris pattern matching a pre-stored iris pattern, the controller 140 recognizes that the user is identified. When the iris recognition apparatus 100 is implemented by using a portable device, in response to the iris being recognized, the controller 140 may unlock the portable device, and, when the iris recognition apparatus 100 is implemented by using a security device attached to a door, the controller 140 may open the door.

Figure 7:
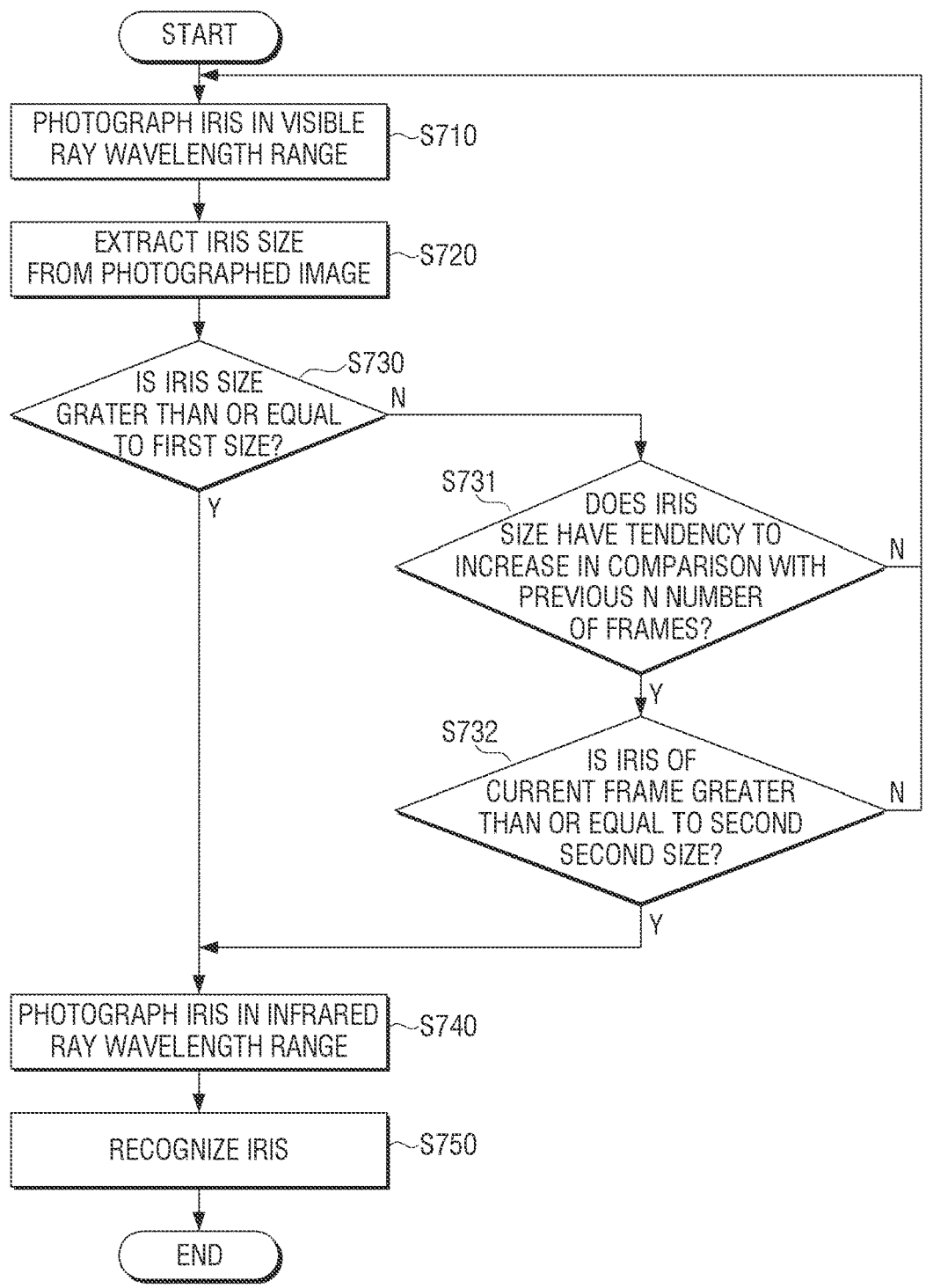

FIG. 7 is a flowchart to illustrate an iris recognition method according to an embodiment of the present disclosure.

First, as explained in FIG. 6, in response to an iris recognition command being input by the user, the iris recognition apparatus 100 photographs the user's iris in the visible ray wavelength range at operation S710.

The size of the iris is extracted from the photographed image at operation S720. The size of the iris may be acquired in various related-art methods. For example, the eye is detected from the image and the edge of the iris and the pupil are detected from the detected eye area. By doing so, the area of the iris is acquired and thus the size of the iris is calculated.

Then, the iris recognition apparatus 100 determines whether the size of the iris is greater than or equal to a predetermined first size at operation S730. In response to determining that the size of the iris is greater than or equal to the predetermined first size, the iris recognition apparatus 100 photographs the iris in the infrared ray wavelength range at operation S740 and performs iris recognition at operation S750.

In response to the size of the iris not being greater than or equal to the predetermined first size, the determiner 130 compares n number of previous frames of a current frame and determines whether the size of the iris has a tendency to increase at operation S731. For example, when n is 2 and the current frame is a third frame, the determiner 130 determines whether the size of the iris in the previous first and second frames has the tendency to increase.

In response to the size of the iris having the tendency to increase, the determiner 130 determines whether the size of the iris in the current frame, the third frame, is greater than or equal to a predetermined second size at operation S732. Since about a few dozen milliseconds may be required until the iris recognition apparatus 100 photographs with infrared rays after the determination of the size of the iris, the iris of the second size may be expected to increase to have the first size or more during that time and thus the iris recognition apparatus 100 is prepared to photograph with infrared rays.

In this case, the storage of the iris recognition apparatus 100 may store a probabilistic model for predicting a change in the size of the iris with time. The probabilistic model may be used to predict the tendency of the iris size to increase, and, once the first size is determined, the second size may be determined using the probabilistic model.

In response to determining that the size of the iris has no tendency to increase or the size not being greater than or equal to the second size even when there is a tendency to increase, the iris recognition apparatus 100 photographs the iris in the visible ray wavelength range again.

The iris recognition method explained in FIG. 6 or 7 may be supplemented with the various embodiments of the present disclosure explained in FIGS. 1 to 5. Therefore, a redundant explanation is omitted.

According to the above-described various embodiments of the present disclosure, the iris recognition apparatus 100 photographs with visible rays first and filters the case in which the user's eye is not appropriate to iris recognition. Therefore, infrared rays are projected only when the user's eye is in the condition appropriate for iris recognition and thus the time the user spends having the eyes exposed to the infrared rays can be reduced. In addition, since the iris recognition apparatus 100 displays a guide object for accurate iris recognition through the display 150, the accuracy of iris recognition can be improved.

The iris recognition method according to the above-described various embodiments of the present disclosure may be stored in a non-transitory computer readable medium. The non-transitory computer readable medium may be mounted in various devices and used.

The non-transitory computer readable medium refers to a medium that stores data semi-permanently rather than storing data for a very short time, such as a register, a cache, and a memory, and is readable by an apparatus. Specifically, the above-described various applications or programs may be stored in a non-transitory computer readable medium such as a compact disc (CD), a digital versatile disc (DVD), a hard disk, a Blu-ray disc, a universal serial bus (USB), a memory card, and a read only memory (ROM), and may be provided.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An iris recognition apparatus comprising:
   a first camera configured to photograph visible light;
   a second camera configured to photograph infrared light;
   an infrared projector configured to radiate infrared light; and
   at least one processor configured to:
      control the first camera to photograph visible light reflected by an iris to obtain a first iris image,
      control the infrared projector to radiate infrared light in response to identifying that first iris image satisfies a predetermined condition that iris recognition success is expected,
      control the second camera to photograph infrared light reflected by the iris while the infrared projector radiates infrared light, to obtain a second iris image, and
      perform iris recognition based on the second iris image.

2. The iris recognition apparatus of claim 1,
   wherein the second camera comprises:
      an image processor comprising a lens through which infrared light reflected by the iris enter, and
   wherein the infrared projector and the image processor are different hardware.

3. The iris recognition apparatus of claim 1, wherein, the at least one processor is further configured to, in response to the infrared light being radiated from the infrared projector for a predetermined time, control the infrared projector to stop radiating the infrared light.

4. The iris recognition apparatus of claim 1, wherein the at least one processor is further configured to, in response to a size of the iris in the first iris image being greater than or equal to a predetermined size, identify that the predetermined condition is satisfied.

5. The iris recognition apparatus of claim 1, wherein the at least one processor is further configured to, in response to a location of the iris in the first iris image being a predetermined area, identify that the predetermined condition is satisfied.

6. The iris recognition apparatus of claim 1,
   wherein the first camera is further configured to photograph a moving image, and
   wherein the at least one processor is further configured to, in a first frame and a second frame which are continuous in the photographed moving image, in response to a size of the iris in the first frame being detected as a first size and the size of the iris in the second frame being detected as a second size which is greater than the first size, identify that the predetermined condition is satisfied.

7. The iris recognition apparatus of claim 1, further comprising a display configured to display a guide object informing an area where an eye should be placed, along with the first iris image, in order to improve accuracy of iris recognition.

8. The iris recognition apparatus of claim 7, wherein the first camera, the second camera, and the display are arranged on a same plane of the iris recognition apparatus.

9. The iris recognition apparatus of claim 1, wherein the iris recognition apparatus is one of a smartphone, a digital camera, smart glasses, a smart watch, or a portable multimedia player (PMP).

10. An iris recognition apparatus comprising:
    a camera configured to photograph visible light or infrared light;
    an infrared projector configured to radiate infrared light; and
    at least one processor configured to:
       control the camera to photograph visible light reflected by an iris to obtain a first iris image,
       control the infrared projector to radiate infrared light in response to identifying that the first iris image satisfies a predetermined condition that iris recognition success is expected, and
       control the camera to photograph infrared light reflected by the iris while the infrared projector radiates infrared light, to obtain a second iris image, and
       perform iris recognition based on the second iris image.

11. The iris recognition apparatus of claim 10, further comprising a visible light projector configured to radiate visible light.

12. An iris recognition method comprising:
    photographing visible light reflected by an iris to obtain a first iris image;
    radiating infrared light in response to identifying that the first iris image satisfies a predetermined condition that iris recognition success is expected;
    photographing infrared light reflected by the iris while the infrared light is radiated to obtain a second iris image, and
    performing iris recognition based on the second iris image.

13. The iris recognition method of claim 12, wherein the performing of the iris recognition comprises, in response to the infrared light being radiated for a predetermined time, stopping the radiating of the infrareds light.

14. The iris recognition method of claim 12, further comprising, in response to a size of the iris in the first iris image being greater than or equal to a predetermined size, identifying that the predetermined condition is satisfied.

15. The iris recognition method of claim 12, further comprising, in response to a location of the iris in the first iris image being a predetermined area, identifying that the predetermined condition is satisfied.

16. The iris recognition method of claim 12,
    wherein the photographing of the visible light reflected by the iris comprises photographing the iris as a moving image, and
    wherein the determining comprises, in a first frame and a second frame which are continuous in the photographed moving image, in response to a size of the iris in the first frame being detected as a first size, and the size of the iris in the second frame being detected as a second size which is greater than the first size, identifying that the predetermined condition is satisfied.

17. The iris recognition method of claim 12, further comprising displaying a guide object informing an area where an eye should be placed, along with the first iris image, in order to improve accuracy of iris recognition.

* * * * *